United States Patent [19]

Kay

[11] Patent Number: 5,513,087
[45] Date of Patent: Apr. 30, 1996

[54] ARCJET STARTUP USING A SHUNT OUTPUT HIGH VOLTAGE PULSE CIRCUIT

[75] Inventor: Robert J. Kay, Kirkland, Wash.

[73] Assignee: Olin Corporation, Redmond, Wash.

[21] Appl. No.: 92,299

[22] Filed: Jul. 15, 1993

[51] Int. Cl.$^6$ ................................................. H02M 3/00
[52] U.S. Cl. ...................... 363/13; 219/121.57; 60/203.1
[58] Field of Search ............................ 363/13; 336/212; 219/121.54, 121.57; 60/203.1

[56] References Cited

U.S. PATENT DOCUMENTS

| | | | |
|---|---|---|---|
| 3,629,759 | 12/1971 | Douglas et al. | 336/82 |
| 4,122,816 | 10/1978 | Fitzgerald | 123/148 DC |
| 4,138,783 | 2/1979 | Portier | 29/606 |
| 4,766,286 | 8/1988 | Iceland | 219/121.5 |
| 4,766,724 | 8/1988 | Gruber | 60/203.1 |
| 4,918,285 | 4/1990 | Thommes | 219/130.1 |
| 4,926,632 | 5/1990 | Smith et al. | 60/203.1 |
| 4,995,231 | 1/1991 | Smith et al. | 60/203.1 |
| 5,036,176 | 7/1991 | Yanaguchi et al. | 219/121.4 |
| 5,296,665 | 3/1994 | Peterson et al. | 219/121.5 |
| 5,359,180 | 10/1994 | Park et al. | 219/121.5 |

OTHER PUBLICATIONS

Northem et al, "Development and Evaluation of a Plasma Jet Flameholder for Scramjets" AIAA/SAE/ASME 20th Joint Propulsion Conference (Jun. 11–13, 1984/Cincinnati, Ohio) American Inst. of Aeronautics & Astronautics, 1633 Broadway, New York, NY 10019. pp. 1 and 9.

Sato et al, "Effectiveness of Plasma Torches for Ignition and Flameholding in Scramjets" AIAA/ASME/SAE/ASME 25th Joint Propulsion Conference. Monterey, CA/Jul. 10–12, 1989. American Inst. of Aeronautics & Astronautics, 370 L'Enfant Promenade, S.W. D.C. 20024. pp. 1–7.

Lewis Research Center, Cleveland, Ohio. "Arcjet Power Supply and Starting Circuit—Power Efficiency is High, Current is Regulated and Starting is Automatic", NASA Tech. Briefs. Jan. 1988. pp. 22–23.

Anne-Marie Warris and Felix Weinberg (Imperial College, London) "Ignition and Flame Stabilization by Plasma Jets in Fast Gas Streams" Twentieth Symposium (International) on Combustion/The Combustion Institute 1984. pp. 1825–1831.

*Primary Examiner*—Peter S. Wong
*Assistant Examiner*—Adolf Berhane
*Attorney, Agent, or Firm*—Gregory S. Rosenblatt; Robert S. Hauser

[57] ABSTRACT

There is disclosed a power supply for igniting and sustaining an electric arc in an arcjet thruster. The power supply is capable of delivering a short duration, high voltage pulse for igniting the arc and then providing a continuous low voltage, high amperage current for sustaining the arc. A circuit in the power supply includes the combination of a low impedance inductor and a high impedance inductor. High voltage is blocked by the high impedance inductor for initiating the arc. As current begins to flow, the high impedance inductor magnetically saturates and the arc sustaining current flows through the low impedance inductor.

21 Claims, 3 Drawing Sheets

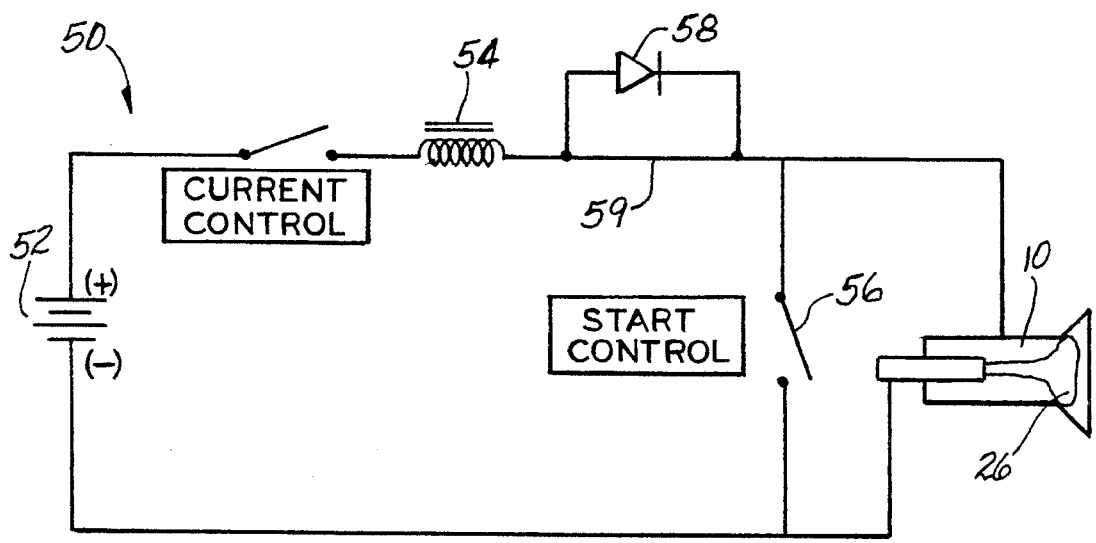
PRIOR ART   FIG-3
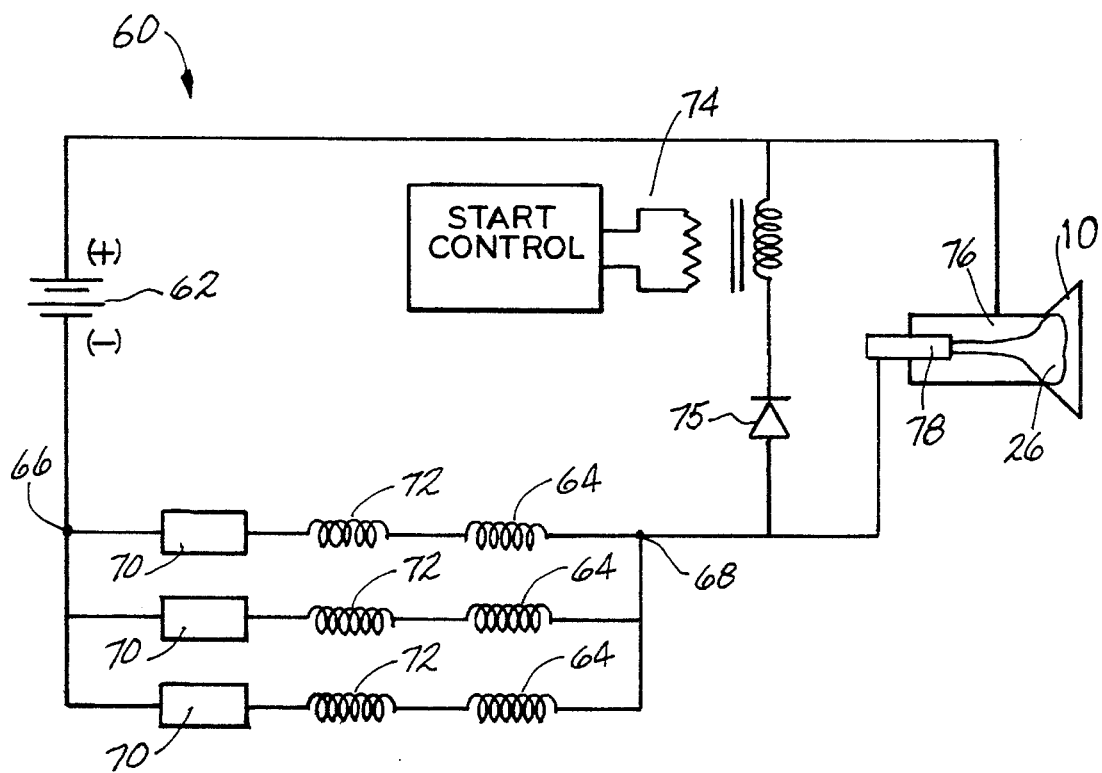
FIG-4

ARCJET STARTUP USING A SHUNT OUTPUT HIGH VOLTAGE PULSE CIRCUIT

STATEMENT AS TO RIGHTS

The U.S. Government has a paid-up license in this invention and the right in limited circumstances to require the patent owner to license others on reasonable terms as provided for by the terms of Contract No. F04611-90-C-005 awarded by the U.S. Air Force.

BACKGROUND OF THE INVENTION

This invention relates to an electric circuit for igniting an arcjet thruster and for maintaining an electric arc following ignition. More particularly, a high impedance inductor blocks a high voltage charge from a high voltage source to ignite the arcjet. After ignition, the high impedance inductor magnetically saturates and during steady state operation, a low voltage, high current charge flows through a low impedance inductor.

Arcjets operate by heating a gas with an electric arc and expanding the heated gas through a nozzle to provide thrust. A high voltage, on the order of 5,000–6,000, volts is required to ignite the arcjet thruster and form an electric arc between a cathode and an anode. Once the electric arc is established, the voltage necessary to sustain that arc is much less, on the order of 100 volts. An arcjet thruster thus requires two types of power, a high voltage pulse to ignite the electric arc a and relatively lower constant voltage to maintain the arc.

Several electric starters for arcjets are conventionally used. In one, as disclosed in U.S. Pat. No. 4,766,724 to Gruber, a flyback inductor is in series with the power supply and arcjet thruster. This type of starter must be capable of supporting full load power after startup has occurred. The inductor must be capable of maintaining a fixed minimum inductance during start up and a fixed minimum current during operation. Satisfying both of these requirements with a single inductor will require a large, heavy device. This weight penalty is not desirable in aerospace and outer space applications.

In a second starter, a shunt incorporates a high voltage diode blocking device in series with the power control unit output. The diode must be capable of sustaining full output current from the power control unit after startup. Again, the suitable diode would be heavy and have high internal resistance degrading power control unit efficiency.

In a third alternative, the ignition voltage is provided from a stand alone starter circuit which is removed once the electric arc is established. While such a system is effective for ground based operations such as arc welders, the weight of the separate starter makes this approach impractical for aerospace or outer space applications.

There exists a need for an electric circuit to ignite an arcjet thruster and maintain the electric arc subsequent to ignition which does not have the problems of the prior art.

SUMMARY OF THE INVENTION

Accordingly, it is an Object of the invention to provide an electric circuit capable of providing a voltage effective to ignite an arcjet thruster and then to maintain that electric arc. It is a feature of the invention that the circuit contains a plurality of power control units in series with low impedance inductors. A plurality of high impedance inductors are disposed between the power control units and low impedance inductors. The high impedance inductors magnetically saturate when current begins to flow. The steady state current then flows through the low impedance inductors.

It is an advantage of the invention that a high amperage, high voltage diode is not required as a blocking device. Still another advantage is that power lost in the starter circuit is minimal.

In accordance with the invention, there is provided a direct current power supply. The power supply includes a controlled constant current power source. One or more parallel low impedance inductors have a common input and a common output. The common input is in series with the controlled constant current power source. The common output is in series with the device to be powered. One or more constant current power control units are in series with the low impedance inductors. One or more high impedance inductors which are capable of magnetic saturation are in series with the constant current power control unit. Connected in parallel with the common output of the circuit is a high voltage, high energy start pulse generating circuit. This circuit is decoupled from the inductor circuit first by the high impedance inductors during start up and then by a diode during steady state operation.

The above stated objects, features and advantages will become more apparent from the specification and drawings which follow.

IN THE DRAWINGS

FIG. 1 shows in cross sectional representation arcjet thruster as known from the prior art.

FIG. 2 schematically shows a circuit for igniting an arcjet thruster as known from the prior art.

FIG. 3 schematically shows a circuit for igniting an arcjet thruster as known from the prior art.

FIG. 4 schematically shows a circuit for igniting an arcjet thruster in accordance with the present invention.

FIG. 5 graphically illustrates the current characteristics of the ignition system of the present invention.

DETAILED DESCRIPTION

Figure 1:
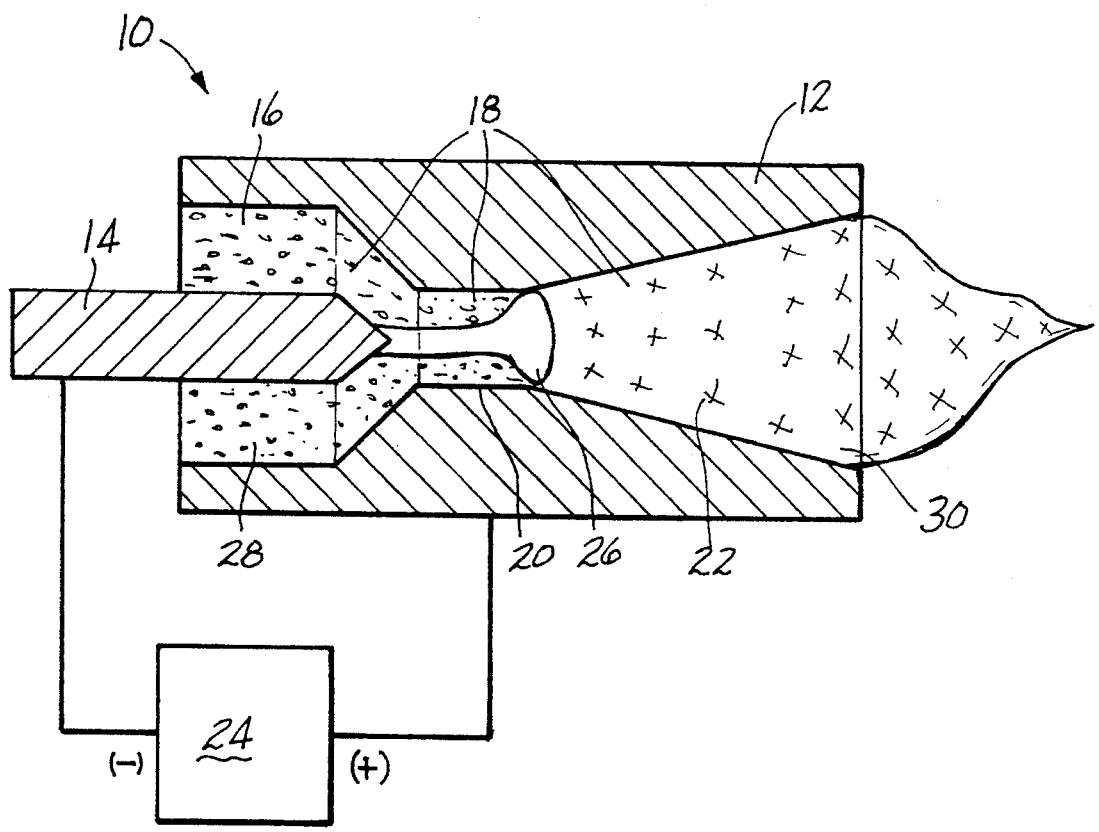

FIG. 1 shows in cross sectional representation an arcjet thruster 10 as known from the prior art and described in U.S. Pat. No, 4,926,632 to Smith et al which is incorporated by reference in its entirety herein. The arcjet thruster 10 includes an anode 12 and a cathode 14 centrally disposed in an aperture 16 formed in the anode 12. The anode 12 and cathode 14 are any suitable electrically conductive metal such as tungsten. The anode 12 includes an arc chamber 18 defined by a constricted throat 20 and a nozzle 22.

A direct current power supply 24 generates a voltage differential between the anode 12 and cathode 14. When a sufficiently large voltage differential is present, an electric arc 26 is generated. The electric arc 26 attaches to the walls of the nozzle 22 slightly downstream of the constricted throat 20.

A plasma source gas 28, such as hydrogen, is introduced to the aperture 16 and flows through the electric arc 26 where it is heated to temperatures in excess of about 3000° C. The Super heated plasma 30 is exhausted through the nozzle 22 at supersonic speeds generating the thrust to drive arcjet thruster 10.

The voltage required to initiate the electric arc 26 is on the order of several thousand volts. Once the electric arc is established, maintaining that electric arc requires a voltage on the order of 100 volts. The power supply 24, must be capable of providing a high voltage pulse to initiate the electric arc 26 and low voltage, high current power to maintain the arc.

Figure 2:
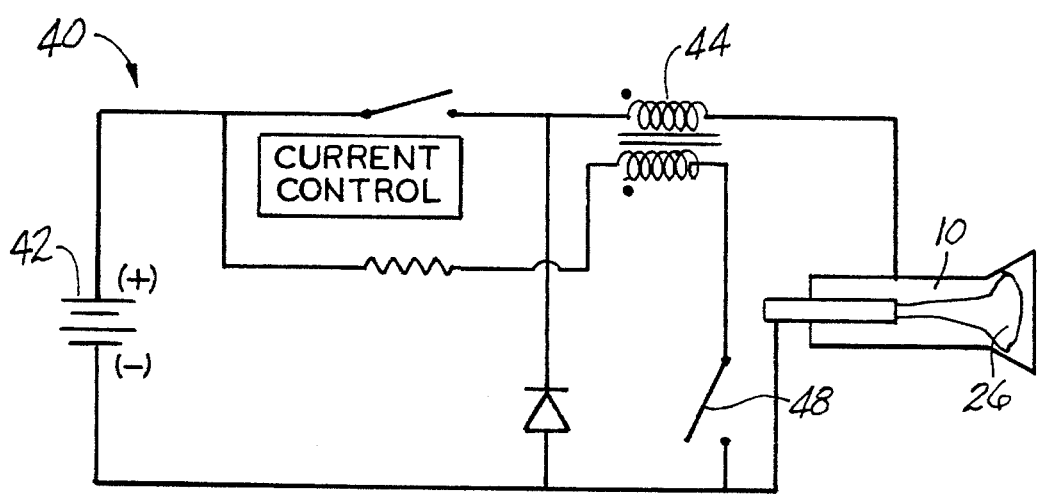

FIG. 2 schematically illustrates a circuit 40 for igniting an electric arc 26 in an arcjet thruster 10. The circuit 40 includes a direct current power supply 42. The output from the power supply 42 flows to an inductor 44 in series with both the power supply 42 and arcjet thruster 10. A switch 48 determines whether the circuit 40 is in a power build up mode, when the switch is closed, or in an ignition mode when the switch 48 is open. For an arcjet thruster 10 rated at 26 kilowatts, a 5 kilovolts pulse having a duration of about 0.5 microseconds is required for ignition.

FIG. 3 schematically illustrates another circuit 50 for igniting an electric arc 26 in an arcjet thruster 10 as known from the prior art. The circuit 50 includes a direct current power supply 52. The output from the direct current power supply 52 flows to an inductor 54 in series with both the power supply 52 and the arcjet thruster 10. A switch 56 determines whether the circuit 50 is in a power build up mode when the switch is closed, or in an ignition mode, when the switch is open.

As disclosed above, a 5 kilovolt, 0.5 microsecond pulse will ignite the arcjet thruster. This pulse could be generated by closing switch 56 and allowing the current to rise in inductor 54, storing energy in the inductor. When switch 56 is opened, the magnetic field associated with inductor 54 collapses and a high voltage pulse crosses the switch 56 and arcjet thruster 10.

The resultant current absorbed by the inductor 54, when rated, for example, at 16.7 microhenry, and not available to the arcjet thruster 10 from the 5 kilovolt pulse is about:

$$i=(V/L)\Delta t=(5\times10^3/16.7\times10^{-6})\times0.5\times10^{-6}$$

$$i=149.7 \text{ amps.}$$

Typically, the circuit 50 cannot provide this amount of current at the 5 kilovolt level. A blocking diode 58 would allow sufficient voltage build up. If diode 58 is present, short 59 is removed. However, once the arcjet thruster 10 is ignited, the circuit 50 will eventually output a constant current of about 236 amps. At this current, assuming a forward drop of only 5 volts for the 5 kilovolt diode 58, the power loss in the diode is 1180 watts. Power loss of this magnitude generates excessive heat and is an excessive drain on the power supply 52.

FIG. 4 schematically illustrates a circuit 60 for igniting an arcjet thruster 10 and maintaining an electric arc 26 after ignition in accordance with the invention. The circuit 60 includes a direct current power supply 62 capable of providing a sufficient voltage and amperage. Generally, a 220 volt direct current power supply is suitable. One or more of parallel low impedance inductors 64 have a common input 66 and common output 68. The common input is in series with direct current voltage source 62 while the common output 68 is in series with the arcjet thruster 10.

The low impedance inductors are formed from a low magnetic permeability material such a molypermalloy and each has an impedance of less than about 200 microhenry. More preferably, the impedance is from about 5 to about 100 microhenry and most preferably from about 10 to about 50 microhenry. The desired inductance is inversely proportional to the frequency of the circuit:

$$l \propto V/(\Delta I \cdot F)$$

One or more constant current power control units 70 are arranged in series with the low impedance inductors 64. While not required to ignite the arcjet thruster 10, the constant power control unit 70 provide a constant low voltage, on the order of 100 volts, high amperage, on the order of 80 amps, to maintain the electric arc 26. In series with the low impedance inductor 64 and the constant current power control unit 70 is one or more high impedance inductors 72. The high impedance inductors 72 are capable of magnetic saturation and have a core of a suitable magnetic saturable material such as ferrite or amorphous iron. The impedance of the high impedance inductors 72 is from about $10^1$ to about $10^5$ times the impedance of the low impedance inductors 64. More preferably, the impedance of the high impedance inductors 72 is from about $10^{1.5}$ to about $10^{2.5}$ times the impedance of the low impedance inductors 64. Preferably, the impedance of the high impedance inductor 72 is from about 5 millihenry to about 20 millihenry and more preferably from about 8 millihenry to about 12 millihenry.

Typically, three high impedance inductors 72 are arranged in parallel. The net inductance of the high impedance inductors 72 is therefore 5/3 millihenry to about 20/3 millihenry. An exemplary net inductance is about 3 millihenry.

A start circuit 74, typically consisting of a high voltage pulse generator and a decoupling high voltage diode 75 generates the requisite start pulse.

Figure 5:
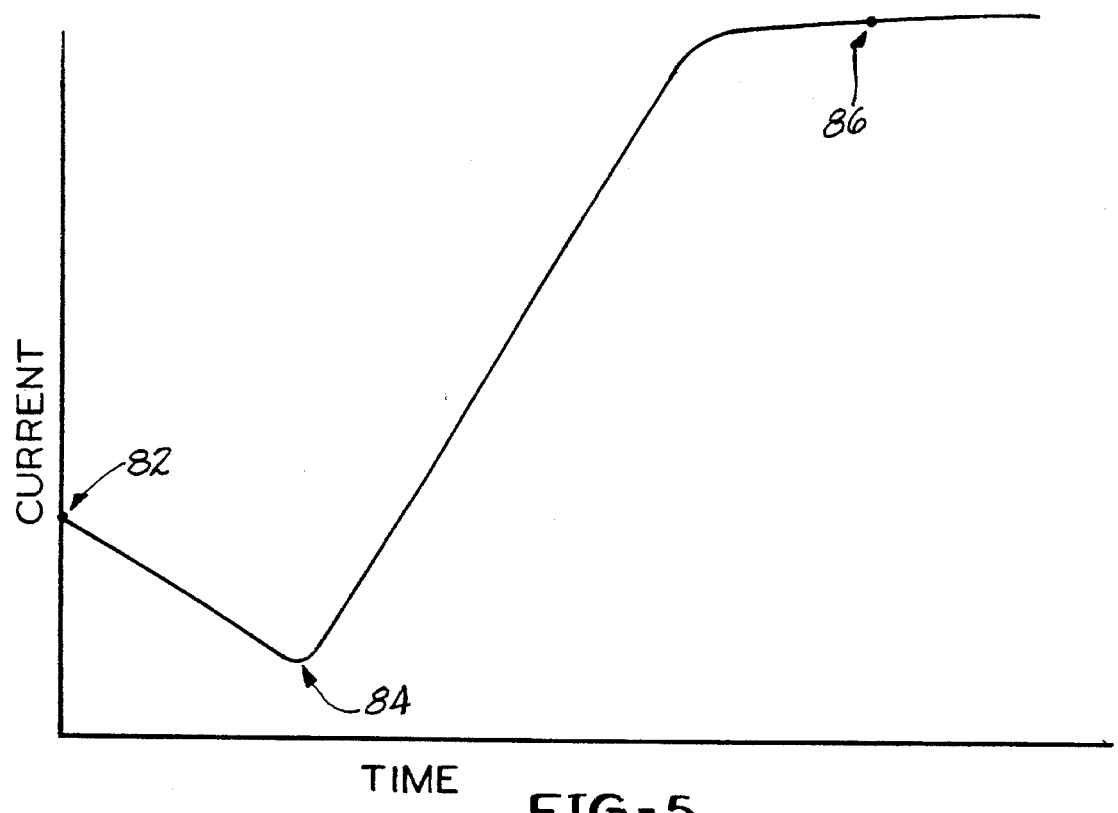

Operation of the circuit 60 is best understood with reference to FIGS. 4 and 5. FIG. 5 graphically illustrates the current passing through the arcjet 10. The arcjet is initiated by the starter 74 generating a high voltage pulse via diode 75. Inductors 72 provide a sufficient block and isolate the low current control part of the total circuit. Upon arcjet 10 voltage breakdown current begins to flow from the starter 74 through the plasma 26 (82 in FIG. 5). The current through the arcjet thruster 10 decreases as the electric arc 26 achieves steady state operation. At this point, the voltage across the arcjet is about 120 volts and the voltage difference across the high impedance blockers 72 is about 100 volts. Current begins to flow from the power control units 70 and rapid magnetic saturation of the high impedance inductors 72 occurs. The minimum current of about 6 amps (84 in FIG. 4) is reacted at full magnetic saturation. The time to full magnetic saturation is from about 50 to about 200 microseconds, and preferably from about 100 to about 150 microseconds.

When the high impedance inductors 72 reach full magnetic saturation they effectively become invisible from the circuit. The low impedance inductor 64 takes effect and the steady state Conditions of a voltage from about 75 to about 150 volts and a current from about 70 to about 100 amps (86 in FIG. 4) go into effect. This low voltage steady state is sufficient to maintain electric arc 26 without damage to the anode 76 and cathode 78.

Use of the circuit 60 prevents the constant current power control units 70 from absorbing energy from the starter. The high impedance inductors 72 are nominally at 9 millihenry. These high impedance inductors 72 are connected in series with the low impedance, nominally 50 microhenry, inductors. The net inductance is thus approximately 3 millihenry and the resulting current absorbed during the ignition sequence is:

$$i=(V/L)\Delta t=(5\times10^3)/3\times10^{-3})\times0.5\times10^{-6}$$

i=0.833 amps.

This is an acceptable current level and provides minimal additional load for the starter circuit. Based on a design that would incorporate the high impedance inductors 72 as part of the output, the effective direct current losses would be power lost in the added resistance of the inductors. Conservatively, this addition is about 0.00075 ohms per inductor. For a three inductor system, the increase is 0.00075/3=250 microhms. The net power loss is:

$$P=(236.7)^2 \times 250 \times 10^{-6}$$

P is approximately 14 watts total which is an acceptably small loss. Since the start circuit ceases operation after start up and the diode 75 is reverse biased, no steady state power is lost in the starter or in the diode.

Figure 6:
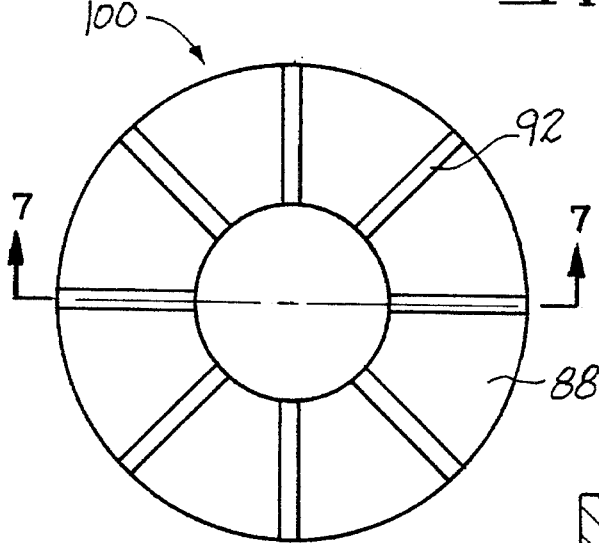
FIG. 6 shows in top planar view an inductor for use in the present invention.
Figure 7:
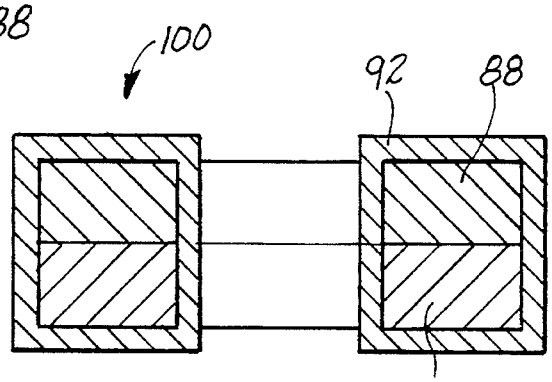
FIG. 7 shows a cross sectional representation the inductor of FIG. 6.

The structure of the inductors is illustrated in top planar view in FIG. 6 and cross-sectional representation in FIG. 7. The inductor 100 is a stacked toroidal core which may have multiple first layers 88 and second layers 90 to achieve the desired impedance. The first layers 88 correspond to the high impedance inductors and have a first magnetic permeability. The second layers 90 correspond to the low impedance inductors and have a second magnetic permeability. This second magnetic permeability is from about $10^{-2}$ to about $10^{-5}$ that of the first magnetic permeability. Preferably, the magnetic permeability ratio is from about $10^{-2.5}$ to about $10^{-3.5}$.

As an example, the first layer 88 can be ferrite with a relative magnetic permeability of 19,000 and the second layer 90 molypermalloy with a relative magnetic permeability of 26.

A copper wire 92 is wrapped around the stacked cores 88, 90 an effective number of turns. The preferred inductor 100 meets the following criteria:

1. The permeability of the first layer 88 must be substantially higher than the magnetic permeability of the second layer 90. In this way, the inductance during ignition of an arcjet thruster is much larger than the inductance during maintenance of the arc.

2. The first layer 88 must be capable of sustaining the volt-second product of the high voltage start pulse without going into saturation, ie. saturation should require at least 0.5 microsecond and preferably up to about 1–1.5 microseconds at the 5 kilovolt start pulse level. This provides the approximate open switch (blocking) mode. If the first layer 88 saturates during the start pulsing, the start pulse is degraded and arcjet startup will not occur.

3. The first layer 88 must be capable of saturating very quickly, on the order of from about 50 to about 200 microseconds, and more preferably on the order of from about 100 to about 150 microseconds, at the 100 volt level after the arcjet has started. This allows normal operation current to flow. In the steady operation mode, the inductor 100 impedance is low and the effect on the power control unit efficiency and dynamic performance is negligible.

An exemplary material for the first layer 88 is ferrite and for the second layer 90 molypermalloy. The wire 92 is any conductive material such as copper of sufficient gauge to sustain the high current passing through the inductor 100. During steady state operation, this current is on the order of from about 50 to about 100 amps. One exemplary copper wire is interwoven strands of 14 gauge wire. Typically, from about 7 to about 10 strands of 14 gauge wire wrapped around the toroidal core from about 15 to about 25 times is suitable. In one working model, the copper wire 92 comprised 20 turns of 9 interwoven strands of 14 gauge copper wire.

While described in terms of an ignition circuit for an arcjet thruster, the electric circuit of the invention is suitable for any device in which a short duration high voltage pulse followed by sustained low voltage, high current power is required.

The patents set forth in the application are intended to be incorporated by reference in their entireties.

It is apparent that there has been provided in accordance with this invention a circuit which fully satisfies the objects, means and advantages set forth hereinabove. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A power supply, comprising:
   (a) a direct current power source;
   (b) one or more parallel low impedance inductors having a common input and a common output, said common input in series with said direct current power source and said common output in series with a device to be powered;
   (c) one or more constant current power control units in series with said low impedance inductors; and
   (d) one or more high impedance inductors that are magnetically saturated during steady state operation of said power supply, said high impedance inductors in series with said low impedance inductors and with said constant current power control units.

2. The power supply of claim 1 wherein the impedance of said high impedance inductors is from about $10^1$ to about $10^5$ times the impedance of said low impedance in conductors.

3. The power supply of claim 2 wherein the impedance of said high impedance inductors is from about $10^{1.5}$ to about $10^{2.5}$ times the impedance of said low impedance inductors.

4. A power supply, comprising:
   (a) a direct current power source;
   (b) one or more parallel low impedance inductors having a common input and a common output, said common input in series with said direct current power source and said common output in series with a device to be powered, wherein said low impedance inductors each have an impedance of less than about 200 microhenry;
   (c) one or more constant current power control units in series with said low impedance inductors; and
   (d) one or more high impedance inductors having an impedance of from about $10^1$ to about $10^5$ times the impedance of said low impedance inductors, said one or more high impedance inductors in series with said low impedance inductors and with said constant current power control units.

5. The power supply of claim 4 wherein the impedance of said low impedance inductors is from about 10 to about 50 microhenry.

6. The power supply of claim 4 wherein the impedance of said high impedance inductors is from 0.5 to about 20 millihenry.

7. The power supply of claim 6 wherein the impedance of said high impedance inductors is from about 8 to about 12 millihenry 8. The power supply of claim 6 wherein said high impedance inductors magnetically saturate within a finite volt-time following the flow of electric current.

9. The power supply of claim 8 wherein the volt-time to magnetic saturation is from about 50 to about 200 microseconds at 100 volts.

10. The power supply of claim 8 wherein the time to magnetic saturation is from about 0.5 to about 1.5 microseconds at 5000 volts.

11. The power supply of claim 8 wherein said low impedance inductor has a molypermalloy core and said high impedance inductor has a ferrite core.

12. The power supply of claim 11 wherein said device to be powered is an arcjet thruster.

13. A power supply for igniting and sustaining an electric arc in an arcjet thruster, comprising:
   a) a direct current power source;
   b) one or more parallel low impedance inductors having a common input and a common output, said common input in series with said direct current power supply, said common output in series with said arcjet thruster;
   c) one or more constant current power control units in series with said low impedance inductors; and
   d) one or more high impedance inductors having an impedance of from about $10^1$ to about $10^5$ times the impedance of said low impedance inductors, said high impedance inductors being magnetically saturated after about 0.5 to 1.5 microseconds at 5000 volts and being in series with said low impedance inductors and with said constant current power control units.

14. A power supply for igniting and sustaining an electric arc in an arcjet thruster, comprising:
   (a) a direct current power source;
   (b) one or more parallel low impedance inductors having a common input and a common output, said common input in series with said direct current power supply, said common output in series with said arcjet thruster, said low impedance inductors having a molypermalloy core;
   (c) one or more constant current power control units in series with said low impedance inductors; and
   (d) one or more high impedance inductors having a ferrite core and an impedance of from about $10^1$ to about $10^5$ times the impedance of said low impedance inductors, said high impedance inductors being magnetically saturated in a finite time after initiation of current flow and being in series with said low impedance inductors and with said constant current power control units.

15. The power supply of claim 14 wherein said high impedance inductors have an impedance of from about $10^{1.5}$ to about $10^{2.5}$ times that is said low impedance inductors.

16. An inductor, comprising:
   a first layer having a first impedance that is less than 200 microhenry and a first magnetic permeability;
   a second layer adjacent said first layer having a second impedance that is from about 0.5 to about 20 millihenry and which is from about $10^1$ to about $10^5$ that of said first impedance and a second magnetic permeability which is from about $10^{-2}$ to about $10^{-5}$ that of said first magnetic permeability; and
   a conductive wire wrapped about said first and second layer.

17. The inductor of claim 16 wherein said second impedance is from about $10^{1.5}$ to about $10^{2.5}$ that is said first impedance and said second magnetic saturation is from about $10^{-2.5}$ to about $10^{-3.5}$ that is said first magnetic permeability.

18. The inductor of claim 16 wherein said second layer magnetically saturates in from about 50 to about 200 microseconds after the initiation of current flow at 100 volts.

19. The inductor of claim 16 wherein said second layer magnetically saturates after from about 0.5 to about 1.5 microseconds following the initiation of current flow at 5000 volts.

20. The inductor of claim 16 wherein said first layer has an impedance of from about 10 to about 50 microhenry and said second layer has an impedance of from about 8 to about 12 millihenry.

21. The inductor of claim 16 wherein said first layer is formed from molypermalloy, said second layer is formed from ferrite and said conductive wire is copper.

* * * * *